Oct. 16, 1928.  
E. G. STAUDE  
1,687,523  
FLUID PRESSURE PUMP FOR POWER PROPELLED VEHICLE CONTROLLING MEANS  
Filed Feb. 15, 1926  
6 Sheets-Sheet 2

INVENTOR  
EDWIN G STAUDE  
BY Paul, Paul & Moore  
ATTORNEYS

Oct. 16, 1928.  1,687,523
E. G. STAUDE
FLUID PRESSURE PUMP FOR POWER PROPELLED VEHICLE CONTROLLING MEANS
Filed Feb. 15, 1926  6 Sheets-Sheet 4

FIG. 6

INVENTOR
EDWIN G STAUDE
BY Paul, Paul & Moore
ATTORNEYS

Patented Oct. 16, 1928.

1,687,523

UNITED STATES PATENT OFFICE.

EDWIN G. STAUDE, OF MINNEAPOLIS, MINNESOTA.

FLUID-PRESSURE PUMP FOR POWER-PROPELLED VEHICLE-CONTROLLING MEANS.

Application filed February 15, 1926. Serial No. 88,422.

This invention relates to devices operated by fluid pressure for controlling the operation of friction brakes of power propelled vehicles to check or retard movement of the vehicle and my present invention has for its object to provide means in or near the pump housing for regulating the flow of the fluid in the circulating system to the control mechanism of the brakes to the end that such control mechanism can be adapted for use when the vehicle is moving forward or backward. The general application of the apparatus to a vehicle is the same as shown and described in my pending application, filed December 11, 1925, Serial No. 74,767 and the purpose of this invention is to disclose the application of the particular pump mechanism shown herein to the brake control of my former application. In this case, I show the brake control mechanism as disclosed in my former application and show its connection and untility as associated with the particular pump device, the claims in this application being directed to the shiftable device that is changed in its position by the change in the point of application of pressure in the pump, in combination with the brake control means that is actuated through the change in position of said shiftable device.

The particular object of the present invention is to provide a fluid pump mechanism and brake control means equally effective regardless of direction of rotation of the pump or whether the vehicle is moving forward or backward.

Another object is to provide means whereby the seepage of the fluid past the pump mechanism will drain back into the transmission case or to such a point where it may be again used in the fluid circuit.

Another object is to provide an inexpensive fluid actuated brake control apparatus adapted to be conveniently connected to the transmission case and manufactured at a comparatively low cost and driven by the motion of the vehicle.

Figure 1:
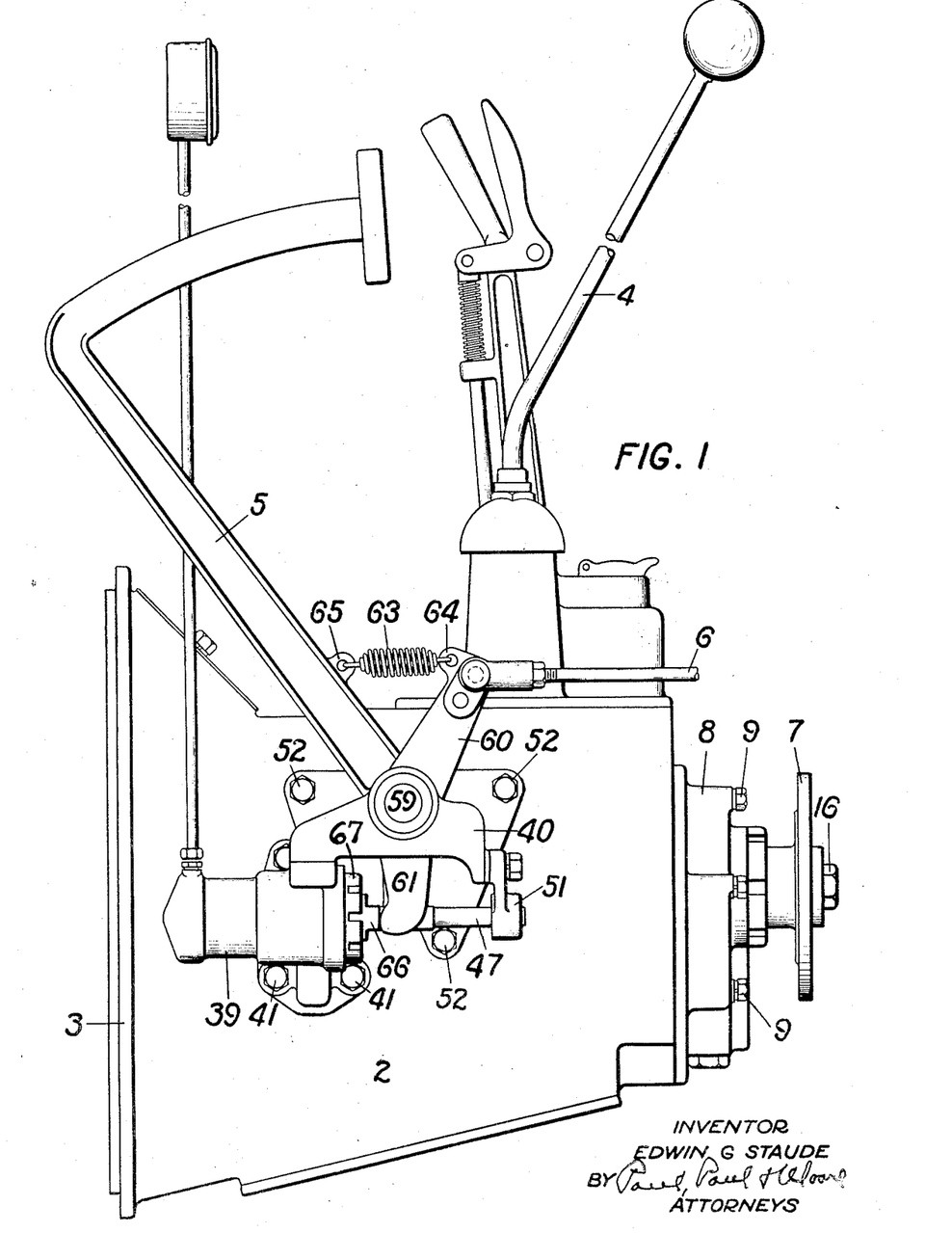
Figure 1 is a side view of a conventional transmission case with my invention applied thereto.
Figure 2:
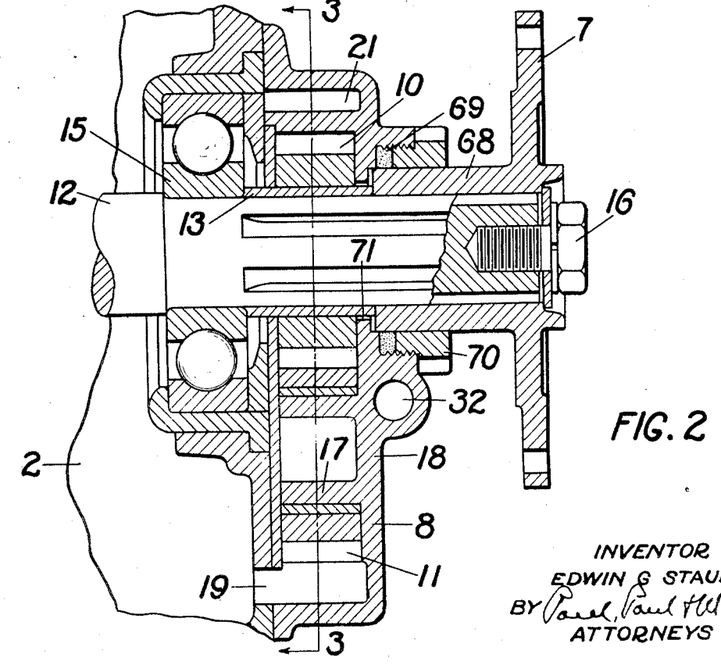
Figure 2 is a vertical section of the rear portion of the transmission case, showing my invention attached thereto in section.

In the drawing, 2 represents a motor vehicle transmission case, having the usual flywheel housing 3 and gear shift lever 4, also the brake pedal 5 and brake rod 6. 7 is the usual propeller or drive shaft coupling of conventional type (see Figure 1). Between the end of the transmission case and the propeller shaft coupling 7, I provide a suitable pump housing 8 (see Figures 1 and 2), secured to the transmission case by a suitable means such as bolts 9. Within this pump housing, I arrange a pair of pump gears 10 and 11, the former mounted on a sleeve 13 that is secured to the usual splined transmission shaft 12, (see Figures 2, 3 and 4). The gear 10 is free to slide on the sleeve 13 and is prevented from rotating thereon by the projections 14. This gear is therefore self-aligning. The sleeve always acts as a spacer and has one end bearing against the inner race of the ball bearing 15, (see Figure 2), and its other end against the coupling 7 which is securely clamped by means of the usual washer and cap screw 16. The other lower gear 11 is mounted to revolve on a boss 17 which projects inwardly from the wall 18 of the pump housing 8. These gears as will be noted from Figures 3 and 4 have intermeshing teeth and will be driven simultaneously with the operation of the transmission shaft.

Figure 3:
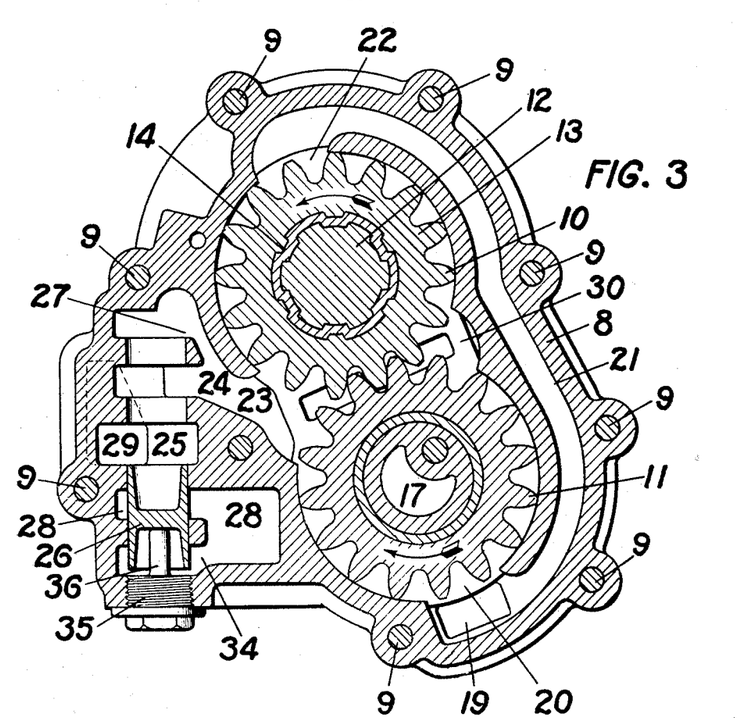
Figure 3 is a section on the line 3—3 of Figure 2, looking in the direction of the arrow, showing the reversing valve in position for going forward.

Figure 3 illustrates the pump gear 10 as mounted to revolve in the direction of the arrow or contra-clockwise when the vehicle is traveling forward and its co-acting gear 11 will revolve therefore in the opposite direction or clockwise as indicated in Figure 3. 19 is an intake port which leads from the transmission case to the pump housing and delivers the fluid to a passage 20 which will supply the gear 11, and a passage 21 leads from the port 19 to a space 22 at the other end of the pump housing which communicates with the pump gear 10 and will supply this gear with fluid. Therefore, regardless of the direction of rotation of the gears the fluid in the transmission case will be drawn through the port 19 and delivered to the gear 11 at the point 20 and to the gear 10 at the point 22. Assuming now that the gears revolve in the direction of the arrow as indicated in Figure 3, it follows that a fluid pressure will accumulate at the point 23 and this will flow into the channel 24 and the valve chamber 25 that is formed in the pump housing. A valve 26 has a reciprocating movement in the pump housing through the chamber 25 and when a pressure is created at the point 23, and in the passage 24, the application of this pressure through the port 27 will cause the valve 26 to move from the position in Figure 4 to that illustrated in Figure 3 and in so moving, the valve will close the space 28 to which the flow of fluid is delivered when the vehicle is traveling in the opposite direction. The movement of the valve to the position shown in Figure 3 opens the passage into the channel 29 and to the brake control mechanism to which I will hereinafter briefly refer.

Figure 4:
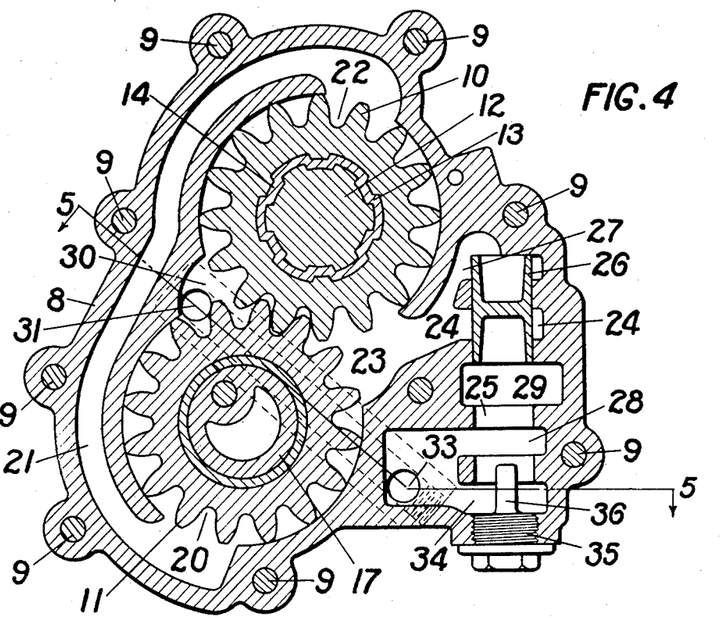
Figure 4 is a section on the line 3—3 looking in the opposite direction of Figure 3 and shows the reversing valve in the position for backing up.
Figure 5:
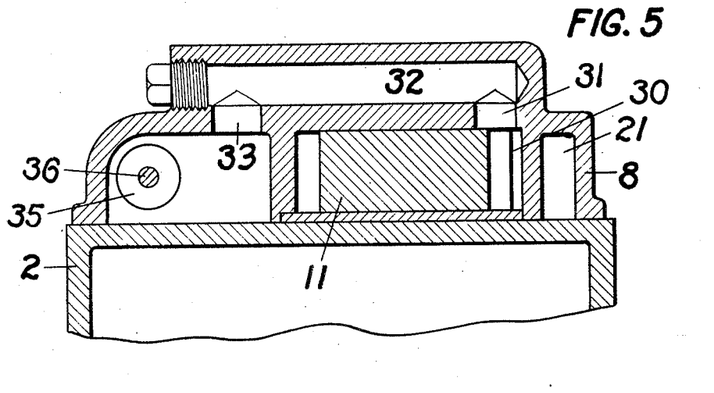
Figure 5 is a detail section on the line 5—5 of Figure 4, showing the passage of the fluid for backing up.
Figure 6:
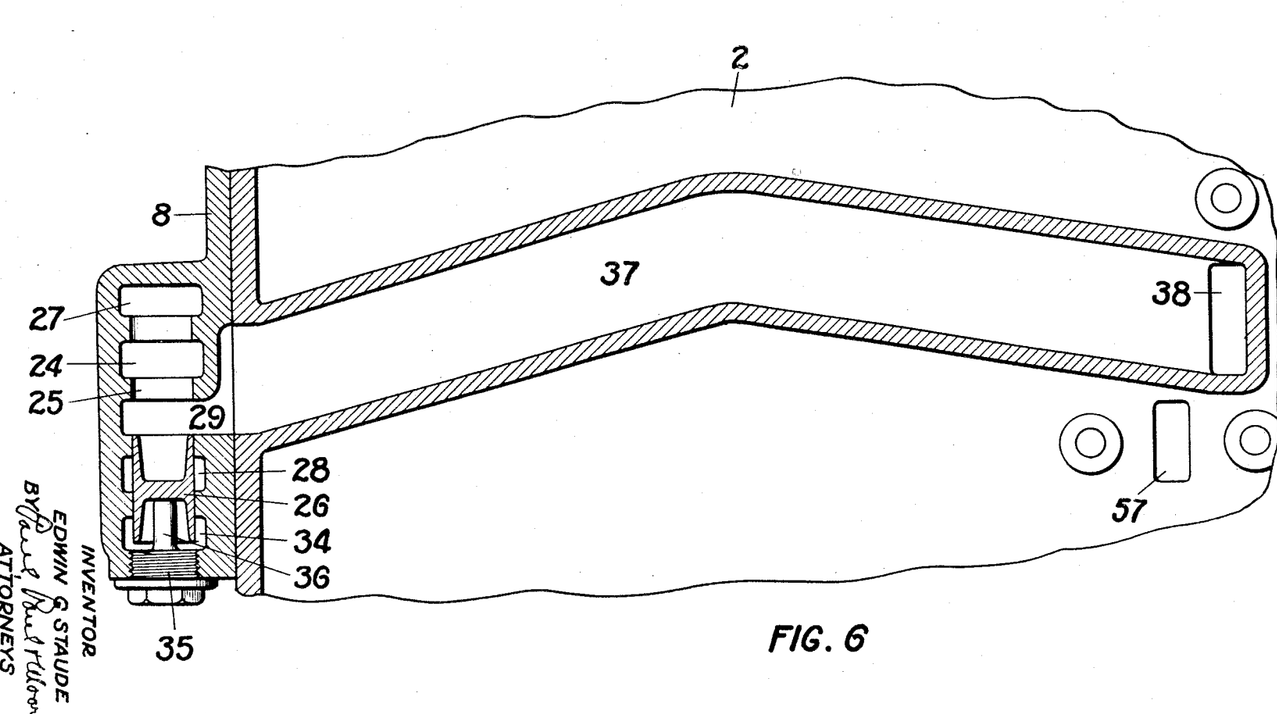
Figure 6 is a section through the pump case and through the reversing valve and through the inside of the transmission case, showing the passage of the fluid to the double controlling valve and the return opening into the transmission case.

In case, however, the vehicle is traveling in the opposite direction as for instance in backing, attention being called particularly to Figure 4, the fluid pressure will accumulate at the point 30, flow through the opening 31 and along the channel 32, through the opening 33, and force the valve 26 to the position illustrated in Figure 4, thereby cutting off the flow of fluid from the chamber 24 and connecting or opening up the channel 28 with the channel 29. Attention is called at this point to the fact that the channel or chamber 28 and the chamber 24 pass entirely around the valve 26. This is for the purpose of equalizing the pressure regardless of whatever position the valve may be in and so that only the pressure operating through the ports 27 or 34 will determine the position of the reversing valve. A suitable plug 35 closes the opening through which the valve is inserted, said plug having a stop 36 to enter the recessed end of the valve that is preferably hollowed out for economy in weight. A channel 37 extends along the wall of the transmission case and connects the pressure side of the pump with the outlet 38 to the inside of the valve chamber 39.

Figures 7, 9:
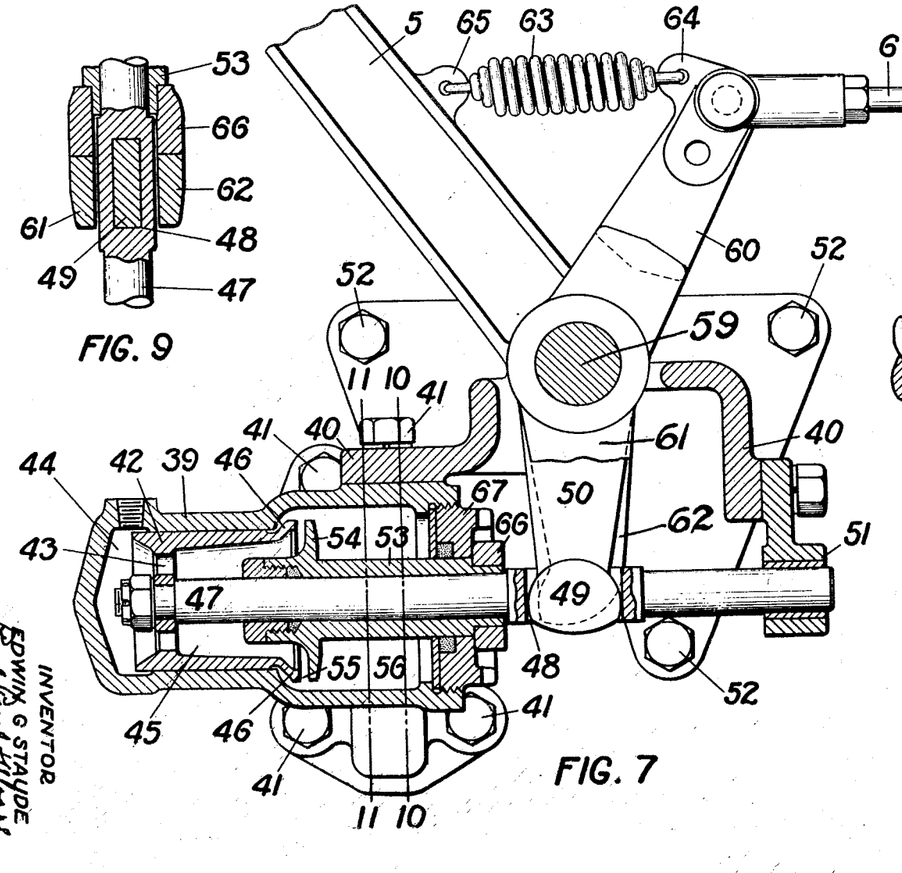
Figure 7 is a section through the double controlling valve and the manner of mounting same in the pedal bracket.
Figure 9 is a detail of the valve rod and its connection with the pedal arm.

The brake control mechanism is similar to that shown and described in my application above referred to and has a valve chamber 39 secured to a pedal bracket 40 and the transmission case 2 by bolts 41 (see Figure 7). A valve 42 is mounted to slide in the casing 39 and has ports 43 at one end leading from the chamber 44 to a chamber or space 45 within the valve. The opposite end of the valve 42 is preferably provided with a flaring flange 46. A rod 47 is connected to the valve 42 and has an opening 48 therein to receive the end portion 49 of the depending arm 50 that is secured to the pedal arm 5. The rod 47 has a bearing 51 secured to the pedal bracket 40 which preferably supports the entire pedal mechanism and is secured to the transmission case by suitable means such as bolts 52. The sleeve 53 is mounted to slide on the rod 47 and has a flanged portion 54 forming a second valve between which and the valve 42 the fluid flows when the transmission circuit is open. Normally the valve 54 will be spaced from the flange 46 of the valve 42 as indicated in Figure 7 forming a passage 55 to allow the free flow of the fluid through the valves from the chamber 44 to the chamber 56 and the port 57 which communicates with the transmission case. The valve 42 as shown is substantially cup-shaped and cylindrical in form and has a limited reciprocating movement. Normally it stands in the position shown in Figure 7 with a gap between its flaring end and the valve 54. As set forth in my application above referred to, the valves 42 and 54 co-operate to temporarily obstruct the flow of fluid when the operator moves the brake lever a certain predetermined distance.

Figure 8:
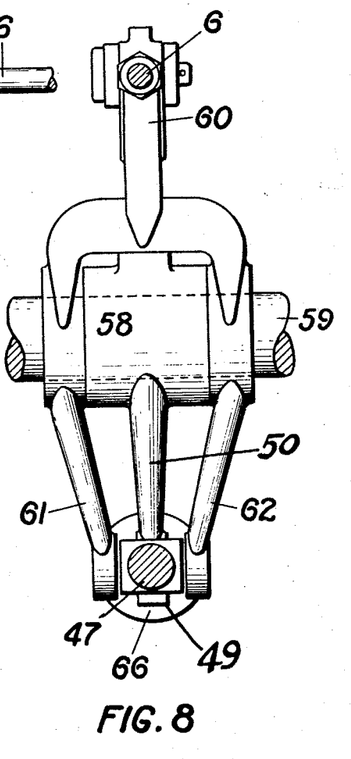
Figure 8 is an end view detail showing the pedal arm and its connection with the valve rod.
Figure 10:
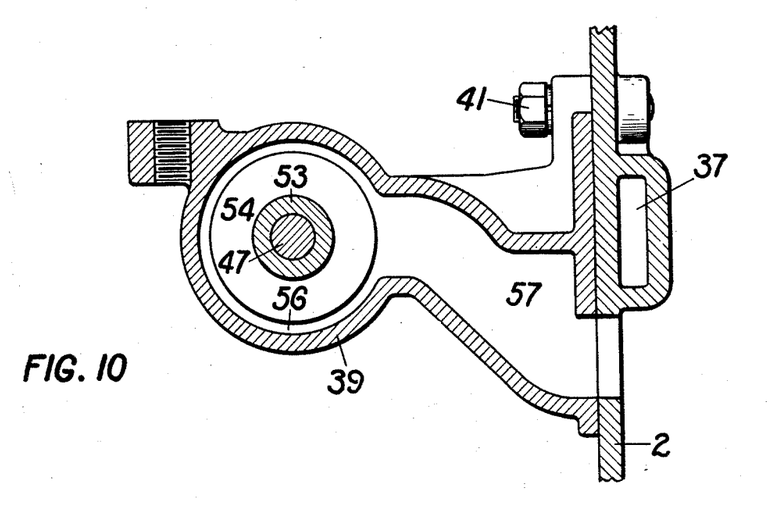
Figure 10 is a section on the line 10—10 of Figure 7, showing the exhaust passage of the fluid from the valve chamber into the transmission case.

A hub is provided on the pedal arm 5 which is rotatably mounted upon a shaft 59 concentric with the arm 60 having the brake rod 6 connected thereto as shown in Figures 7 and 8. The brake rod arm 60 has a bearing on the shaft 59 and has two depending arms 61 and 62. A tension spring 63 is secured to a lug 64 on the brake rod arm and to a lug 65 on the brake pedal 5. This spring normally functions to yieldingly hold the brake rod arm 60 toward the pedal 5. A fork having arms 61 and 62 is preferably formed integrally with the brake arm 60 and depends therefrom and engages a washer or flanged member 66 terminally mounted upon a sleeve 53 slidably mounted in a plug 67 that is secured at one end to the valve casing 39 as shown in Figure 7. The sleeve 53 is concentrically bored to receive the rod 47 and provide a support therefor. A suitable packing is provided in the plug 67 to engage the sleeve 53 to prevent oil leakage between the sleeve and the bore of the plug 67.

The pump gears 10 and 11 will rotate continuously with the transmission shaft and therefore with the motion of the vehicle thereby causing the inelastic fluid such as oil to be drawn from the transmission case or other source of supply into the port 19 and fed to the gear 10 through the passage 21 and the opening 22 and the gear 11 through the opening 20 thereby building up a pressure in the chamber 23 and passage 24, and flowing through the chamber 25 into the channel 29, the chamber 37, through the ports 38 into the chamber 44, through the ports 43 of the valve 42 and out through the space 55 between the flanged end 46 of the valve 42 and the valve 54 and into the chamber 56 and to the passage 57, that is connected with the transmission case, thereby completing the circuit of the inelastic fluid.

Referring now to Figure 1, and the application of this pump device to a vehicle brake control, it will be noted that when the pedal 5 is depressed, the arm 50 connected with the rod 47 through the opening 48 and the projection 49 therein will cause the valve 42 to move toward the valve 54 and close the passage 55 thereby building up a pressure which will act against the valve 54, and through the sleeve 53 and the member 66, cause a pressure against the forked arms 61 and 62. These arms being a part of the brake arm 60 will transmit a pull on the brake rod 6 proportionate to the degree of pressure of the movement of the foot on the brake pedal and thereby the brake mechanism will be applied as fully described in my application above referred to.

If the vehicle is traveling in the opposite direction, that is in backing, the pump gear 10 being on the transmission shaft and driven by the motion of the vehicle will be rotated in the opposite direction as will also the pump gear 11 or contrary to the direction shown in Figure 3. This movement of the gears will cause the oil or other fluid to be fed in the same manner through the port 19 and the opening 20 the channel 21 and the opening 22, but will build up the pressure in the chamber 30 from whence it will flow out through the opening 31 and reverse the position of the valve 26 from that shown in Figure 3. Thus I am able by mounting this slide valve in the walls of the pump housing to operate the brake control mechanism regardless of whether the pump gears and the vehicle are moving forward or backward. The brake mechanism will be operated in the same manner in both cases, the slide valve 26 compensating for the difference in the location or point where the pressure is accumulated or built up resulting from the change in direction of rotation of the pump gears. I regard this valve, therefore, and its co-operation with the pump gears and the brake control device as an essential feature of my present invention.

Figures 11, 12:
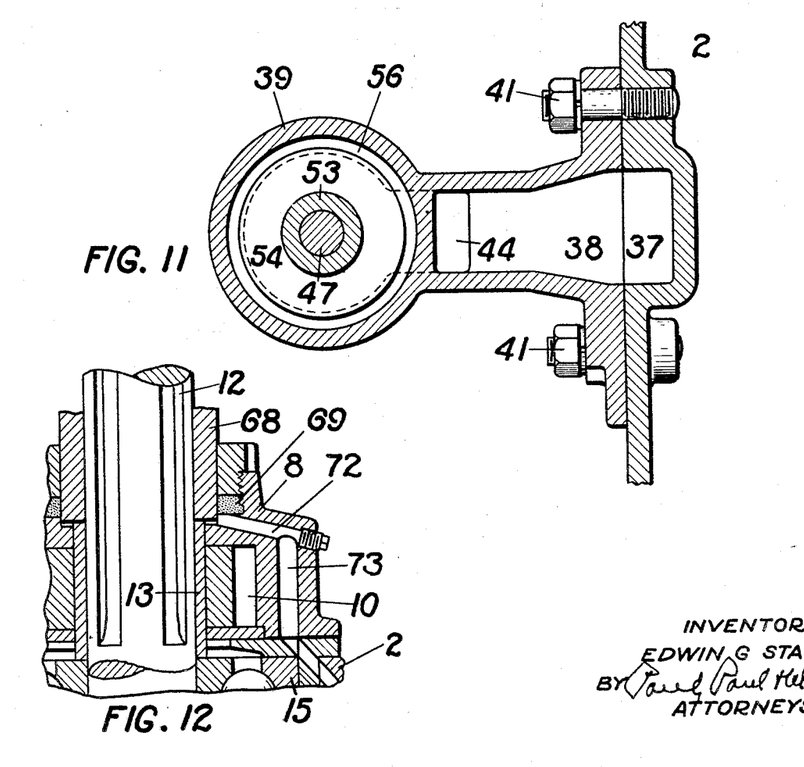
Figure 11 is a section on the line 11—11 of Figure 7, showing the passage of the fluid from the pump to the valve chamber.
Figure 12 is a detail of the pump case showing the passage of the fluid which seeps past the pump gears and its flow back into the transmission case.

To prevent the fluid from seeping out over the hub 68 of the coupling 7, I prefer to provide a packing 69 held in place by a gland 70. This will cause the fluid to accumulate in the space 71 which, unless relieved, will rapidly build up to correspond to the pressure in the space 29, and to relieve this pressure, I provide channels 72 and 73 communicating with the transmission case (see Figure 12), thus relieving the pressure at this point and making it unnecesssary to use any great degree of caution in applying the packing 69.

I claim as my invention:

1. A rotary pump comprising a gear chamber and meshing gears therein, an intake passage communicating with the chamber and delivering to each gear at a point remote from the meshing zone of the gears, a bore having a valve reciprocable therein, an outlet passage communicating with the bore intermediately, passages communicating with the bore at opposite sides of said outlet passage and respectively with said gear chamber at opposite sides of and adjacent the meshing zone of the gears, the arrangement being such that fluid pressure set up adjacent one end of the bore will cause the valve to move toward the opposite end, opening the pressure side of the pump to the outlet and closing the opposite side to said outlet, said intake passage, bore and one other passage being in the same plane with the gears.

2. A pump comprising a gear chamber and meshing gears therein, an intake passage communicating with the chamber and delivering to each gear at a point at the end of a line passing through the rotative axes of the gears, a bore having a valve reciprocable therein, an outlet passage communicating with the bore intermediately, passages communicating with the bore at opposite sides of said outlet passage and respectively with said gear chamber at opposite sides of and adjacent the meshing zone of the gears, the arrangement being such that fluid pressure set up adjacent one end of the bore will cause the valve to move toward the opposite end, opening the pressure side of the pump to the outlet and closing the opposite side to said outlet.

3. A pump housing as a die casting, having a gear chamber, and means arranged to obtain reversal of flow upon reversal of pump gears arranged in said chamber, and including an intake conduit communicating with said gear chamber, said chamber and intake conduit opening at one side of the housing and being adapted to be closed by the support to which the housing is attached.

4. A pump housing as a die casting, having a gear chamber, and means arranged to obtain reversal of flow upon reversal of pump gears arranged in said chamber and including an intake conduit communicating with said gear chamber and a valve, said chamber and intake conduit opening at one side of the housing and being adapted to be closed by the support to which the housing is attached, said circulating conduits and valve being substantially in the plane of the gear chamber.

5. In combination with a reservoir casing, a pump housing attached to the outer face of said casing and having a gear chamber having pump gears therein, means arranged to obtain reversal of flow upon reversal of the gears and including an intake conduit communicating with said casing and said gears, the wall of said casing forming a closure for the gear chamber and intake conduit.

6. In combination with a reservoir casing, a pump housing attached to the outer face of said casing and having a gear chamber having pump gears therein, means arranged to obtain reversal of flow upon reversal of the gears and including an intake conduit communicating with said casing and gears, the wall of said casing forming a closure for the gear chamber and intake conduit, and said circulating conduits being substantially in the plane of the gear chamber.

7. In combination with a casing and shaft projecting outwardly through a wall thereof, a pump housing attached to the outer face of said casing and having a gear chamber having pump gears journaled therein one of which gears has a splined connection with said shaft, means arranged to obtain reversal of flow upon reversal of the gears, and including an intake conduit communicating with said casing and said gears, the wall of said casing forming a closure for the gear chamber and intake conduit.

8. In combination with a casing and shaft projecting outwardly through a wall thereof, a pump housing attached to the outer face of said casing and having a gear chamber having pump gears therein, one of which has a splined connection with said shaft, circulation conduits arranged to obtain a reversal of flow upon reversal of the gears and including a valve, and a common inlet in communication with the casing and separately with each gear at a point other than the meshing zones, the wall of said casing forming a closure for said gear chamber and common inlet.

9. In combination with a casing and shaft projecting outwardly through a wall thereof, a pump housing attached to the outer face of said casing and having a gear chamber having pump gears journaled therein one of which has a splined connection with said shaft, circulation conduits including a common outlet traversed by a bore, a valve member reciprocable in said core across the common outlet and adapted at opposite limits of movement to fully open said outlet, an inlet in communication with the casing and separately with each gear at a point other than the meshing zones, passages respectively communicating with the bore at opposite ends and with the gear chamber at opposite sides of the meshing points of the gears, the wall of said casing forming a closure for said gear chamber and common inlet.

10. In combination with a casing and shaft projecting outwardly through a wall thereof, a pump housing attached to the outer face of said casing and having a gear chamber having pump gears journaled therein, a sleeve splined to said shaft one of said gears splined to said sleeve, said shaft having a bearing arranged upon the casing and said sleeve being engaged at one end with the bearing, a driving element coupled to said shaft and abutting the sleeve at the opposite end, said housing having means arranged to obtain reversal of flow upon reversal of the gears and including a single reciprocable valve member, and intake conduits communicating with said casing, the wall of said casing forming a closure for said gear chamber and intake conduits.

11. In combination with a casing and shaft projecting outwardly through a wall thereof, a pump housing attached to the outer face of said casing and having a gear chamber having pump gears journaled therein, a sleeve splined to said shaft one of said gears splined to said sleeve, said shaft having a bearing arranged upon the casing, and said sleeve being engaged at one end with the bearing, a driving element coupled to said shaft and abutting the sleeve at the opposite end, said housing having means arranged to obtain reversal of flow upon reversal of the gears and including a single reciprocable valve member and intake conduits communicating with said casing, and all circulation conduits being substantially in the plane of the gear chamber.

12. In combination with a casing and shaft projecting outwardly through a wall thereof, a pump housing as a die casting attached by one face against the outer face of said casing and having a gear chamber having pump gears journaled therein, one of which has a splined connection with said shaft, circulation conduits including a common outlet traversed by a bore, a cylindrical valve member reciprocable in said bore across the common outlet, an inlet communicating with the casing and separately with the gear chamber against each gear at a point other than the meshing zone of the gears, passages respectively communicating with the bore at opposite ends and with the gear chamber at opposite sides of the meshing zone of the gears, and intermediate the points of communication of the inlet with the gears, and all passages being substantially in plane of the chamber.

13. A pump housing as a die casting having a gear chamber having pump gears therein, means for obtaining reversal of flow when the gears are reversed including a common outlet traversed by a bore, a cylindrical valve member reciprocable in said bore across the common outlet, an inlet communicating with the casing and separately with each gear at a point other than the meshing zone of the gears, passages respectively communicating with the bore at opposite ends and with the gear chamber at opposite sides of the meshing zone of the gears, the arrangement being such that the force for reciprocating the valve is applied in a direction of reciprocation only, and the length of the valve being such that when at limits of movement the entire area of the common outlet is exposed, and said bore extending only partially through said housing from one face thereof, one end of the bore forming a stop to limit valve movement in one direction, and a plug adjustable in the other end of the bore to limit valve movement in the opposite direction and said inlet and gear chamber opening at one side of the housing, and said inlet and valve being in the plane of the gear chamber.

In witness whereof, I have hereunto set my hand this 2nd day of February, 1926.

EDWIN G. STAUDE.